(12) United States Patent
Zhu et al.

(10) Patent No.: US 11,025,318 B2
(45) Date of Patent: Jun. 1, 2021

(54) ELECTRONIC DEVICE, COMMUNICATION METHOD AND MEDIUM

(71) Applicant: Sony Corporation, Tokyo (JP)

(72) Inventors: Xudong Zhu, Beijing (CN);
Zhaocheng Wang, Beijing (CN);
Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 126 days.

(21) Appl. No.: 16/344,021

(22) PCT Filed: Jan. 18, 2018

(86) PCT No.: PCT/CN2018/073240
§ 371 (c)(1),
(2) Date: Apr. 23, 2019

(87) PCT Pub. No.: WO2018/137547
PCT Pub. Date: Aug. 2, 2018

(65) Prior Publication Data
US 2019/0341984 A1 Nov. 7, 2019

(30) Foreign Application Priority Data

Jan. 26, 2017 (CN) .......................... 201710056866.8

(51) Int. Cl.
*H04B 7/06* (2006.01)
*H01Q 9/04* (2006.01)
*H04W 16/28* (2009.01)

(52) U.S. Cl.
CPC ............. *H04B 7/06* (2013.01); *H01Q 9/0407* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 2018/0131429 A1* | 5/2018 | Park ........................ | H04B 7/063 |
| 2018/0287678 A1* | 10/2018 | Kihira ................... | H01Q 9/0435 |
| 2019/0036573 A1* | 1/2019 | Park ........................ | H04B 7/0456 |
| 2019/0109686 A1* | 4/2019 | Jiang ....................... | H04L 5/0048 |

FOREIGN PATENT DOCUMENTS

| | | |
|---|---|---|
| CN | 101179313 A | 5/2008 |
| CN | 101388701 A | 3/2009 |
| CN | 105122869 A | 12/2015 |
| CN | 105262520 A | 1/2016 |
| CN | 106341169 A | 1/2017 |
| WO | 2013/100719 A1 | 7/2013 |
| WO | 2016/075847 A1 | 5/2016 |

OTHER PUBLICATIONS

International Search Report and Written Opinion dated Mar. 27, 2018 for PCT/CN2018/073240 filed on Jan. 18, 2018, 9 page including English Translation.

* cited by examiner

*Primary Examiner* — Christopher M Crutchfield
*Assistant Examiner* — Alan L Lindenbaum
(74) *Attorney, Agent, or Firm* — Xsensus LLP

(57) ABSTRACT

The disclosure is related to an electronic device, communication method and medium. The electronic device comprises processing circuitry. The processing circuitry is configured to determine a sub array of a curved surface array antenna associated with the electronic device to serve a target communication apparatus, based on a channel state between the curved surface array antenna and the target communication apparatus.

20 Claims, 9 Drawing Sheets

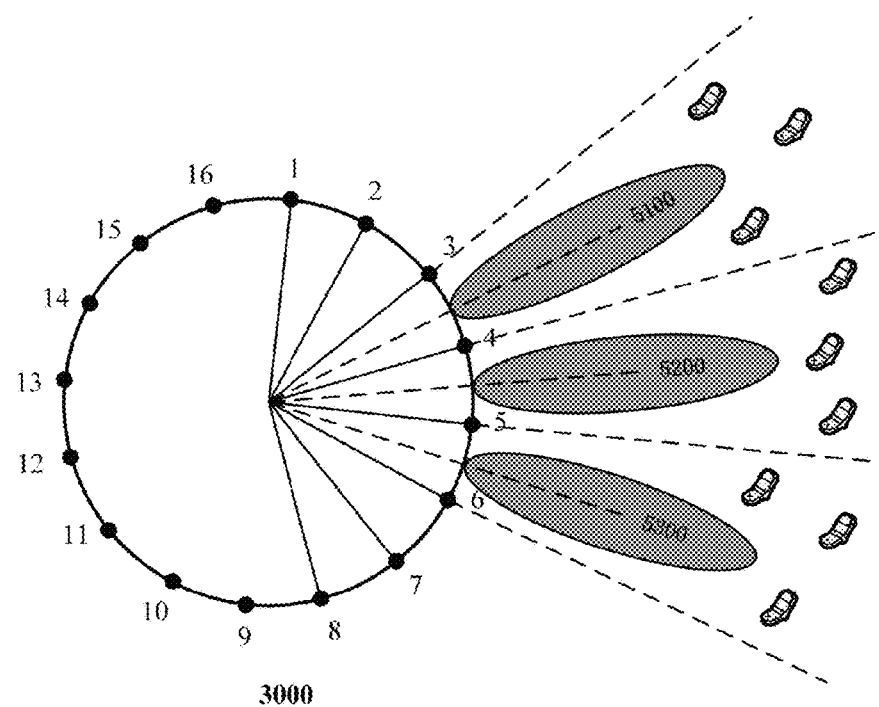
Fig.5
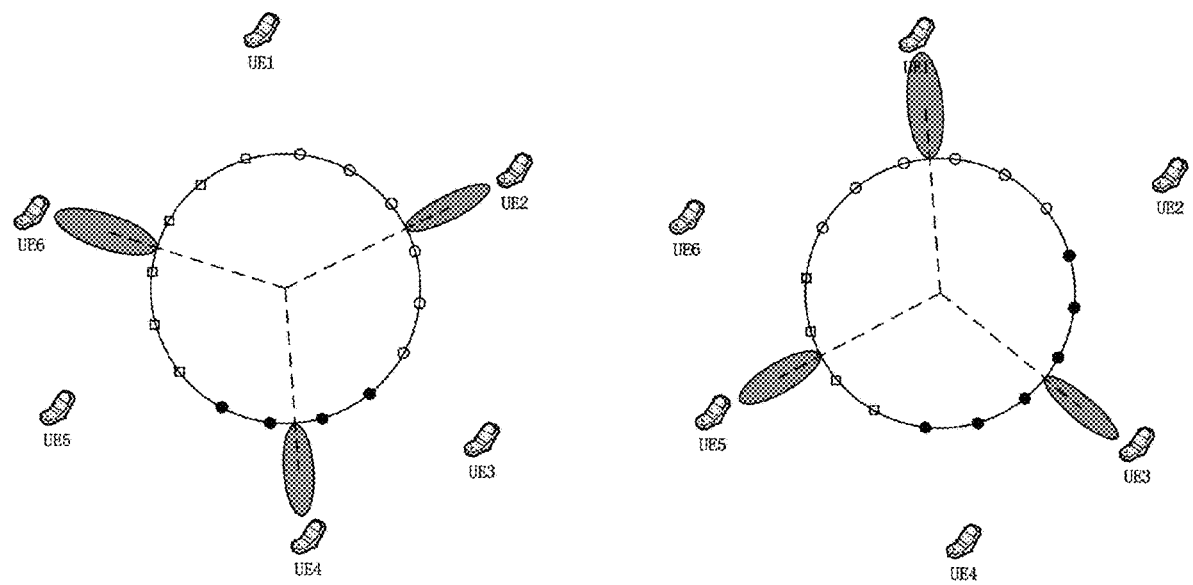
Fig.6A
Fig.6B

ELECTRONIC DEVICE, COMMUNICATION METHOD AND MEDIUM

CROSS-REFERENCE TO RELATED APPLICATIONS

The present application is based on PCT filing PCT/CN2018/073240, filed Jan. 18, 2018, which claims priority to P.R.C. patent application No. 201710056866.8 filed Jan. 26, 2017, and entitled "ELECTRONIC DEVICE, COMMUNICATION METHOD AND MEDIUM ", the entire contents of each are incorporated herein by reference.

TECHNICAL FIELD

The present disclosure relates generally to an electronic device, a communication method and a medium. More specifically, the present disclosure relates to techniques for using a curved surface array antenna to perform communication.

BACKGROUND

A Massive Multiple-Input Multiple-Output (MIMO) technology has drawn extensive attention in academic and industrial fields in recent years, because it may improve spectral efficiency and energy efficiency significantly. With respect to the MIMO technology, most researches are based on an architecture of a Uniform Linear Array (ULA) antenna. However, the Uniform Linear Array antenna is not suitable for deployment of the massive MIMO in a real system. By introducing a dimension in the vertical direction, a Uniform Planar Array (UPA) antenna may greatly reduce the size of the array antenna, and therefore is paid extensive attention and researched.

In a prior cellular architecture, each cell will be divided into 3 sectors, and 3 UPAs will be deployed at a base station, serving each sector independently. Specifically, in comparison with a conventional cell where one wide beam is used to provide coverage to one sector, UPA can provide a plurality of narrow beams with high gain to provide coverage to the sector.

SUMMARY

However, the inventors of the present disclosure find that, since Angle-of-Arrivals (AOAs) of different users at a base station are different, UPA needs to generate beams in different directions. These beams will have different gains and beam widths, wherein, a beam perpendicular to a UPA plane will have the highest gain and the narrowest width, while a beam directing to edge of the sector has low gain and wide width. Therefore, when a user is located at the edge of the sector, communication quality thereof deteriorates.

The present disclosure proposes a technique for using a curved surface array antenna to perform communication. The technique may improve communication quality of the user located at the edge of the sector.

According to one aspect of the present disclosure, there is provided an electronic device. The electronic device includes processing circuitry configured to: determine a sub array of a curved surface array antenna associated with the electronic device to serve a target communication apparatus, based on a channel state between the curved surface array antenna and the target communication apparatus.

According to another aspect of the present disclosure, there is provided an electronic device. The electronic device includes processing circuitry configured to: determine a channel state between the electronic device and a target communication apparatus; and perform control to transmit information comprising the channel state to the target communication apparatus, such that the target communication apparatus is able to determine a sub array of a curved surface array antenna associated with the target communication apparatus to communicate with the electronic device.

According to another aspect of the present disclosure, there is provided a signal processing method. The signal processing method comprises: determining a sub array of a curved surface array antenna associated with an electronic device to serve a target communication apparatus, based on a channel state between the curved surface array antenna and the target communication apparatus.

According to another aspect of the present disclosure, there is provided a communication method. The communication method comprises: determining a channel state between an antenna associated with an electronic device and a target communication apparatus; and transmitting information comprising the channel state to the target communication apparatus, such that the target communication apparatus is able to determine a sub array of a curved surface array antenna associated with the target communication apparatus to communicate with the electronic device.

According to another aspect of the present disclosure, there is provided an electronic device. The electronic device includes processing circuitry configured to: divide a curved surface array antenna into a plurality of overlapping or adjacent sub arrays longitudinally; and allocate a dedicated reference signal resource for each of the sub arrays, so as to transmit beam-formed reference signals in different horizontal directions.

According to another aspect of the present disclosure, there is provided a communication method. The communication method comprises: divide a curved surface array antenna into a plurality of overlapping or adjacent sub arrays longitudinally; and allocate a dedicated reference signal resource for each of the sub arrays, so as to transmit beam-formed reference signals in different horizontal directions.

According to another aspect of the present disclosure, there is provided a computer-readable storage medium. The computer-readable storage medium has instructions stored thereon which when executed by a processor cause the processor to perform any one of the above-mentioned methods.

BRIEF DESCRIPTION OF THE DRAWINGS

FIG. 5 illustrates a schematic view of performing beam training in an embodiment according to the present disclosure.

FIGS. 6A and 6B illustrate a schematic view of grouping users in an embodiment according to the present disclosure.

DETAILED DESCRIPTION

Figure 1:
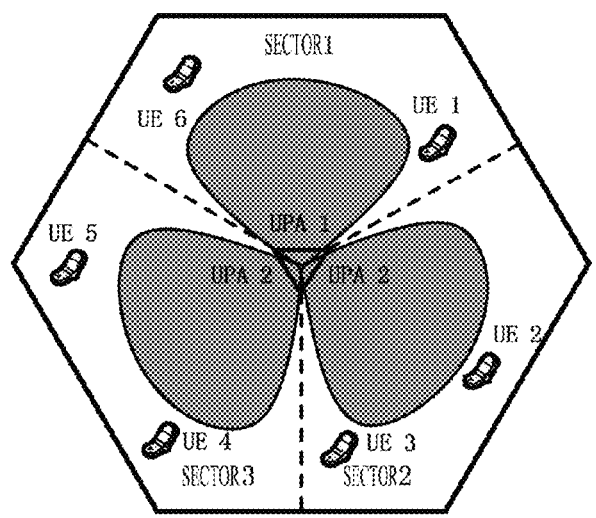
FIG. 1 illustrates a schematic view of communication of a conventional cell using a planar array antenna.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. System overview
2. Processing of base station
3. Processing of user equipment
4. Simulation result
5. Application examples
6. Conclusion

1. System Overview

FIG. 1 illustrates a schematic view (a top view) of communication of a conventional cell 1000 using a planar array antenna. The cell 1000 is divided into 3 sectors (broken lines in FIG. 1 denote division of the sectors), i.e. a sector 1, a sector 2 and a sector 3. 3 Uniform Planar Array (UPA) antennas (i.e. UPA1, UPA2 and UPA3) are deployed at a base station (not shown), and serve the sector 1, the sector 2 and the sector 3 independently, respectively. Each UPA antenna may transmit beams in different directions. Among the beams transmitted by the UPA antenna, a beam in a direction perpendicular to the UPA antenna plane (i.e. having an angle of about 0 degree with the normal of the UPA antenna plane) has higher gain, whereas a beam in a direction having a larger angle with the normal of the UPA antenna plane has lower gain.

FIG. 1 exemplarily illustrates 6 user equipments (UEs). In FIG. 1, since UE2 and UE6 are located at locations which are relatively close to centers of the sectors, beams toward UE2 and UE6 have smaller angles with the normals of the UPA antenna planes. Therefore, beams which serve UE2 and UE6 have higher gain, and UE2 and UE6 have higher communication quality. By contrast, since UE1 and UE3 are located near boundaries between sectors (i.e. edges of sectors), beams toward UE1 and UE3 have larger angles with the normals of the UPA antenna planes. Therefore, beams which serve UE1 and UE3 have lower gain, and UE1 and UE3 have lower communication quality.

The present disclosure proposes to replace the UPA antenna by a curved surface array antenna at the base station to improve communication quality of the user equipments at edges of the sectors(for example, UE1 and UE3).

Figure 2:
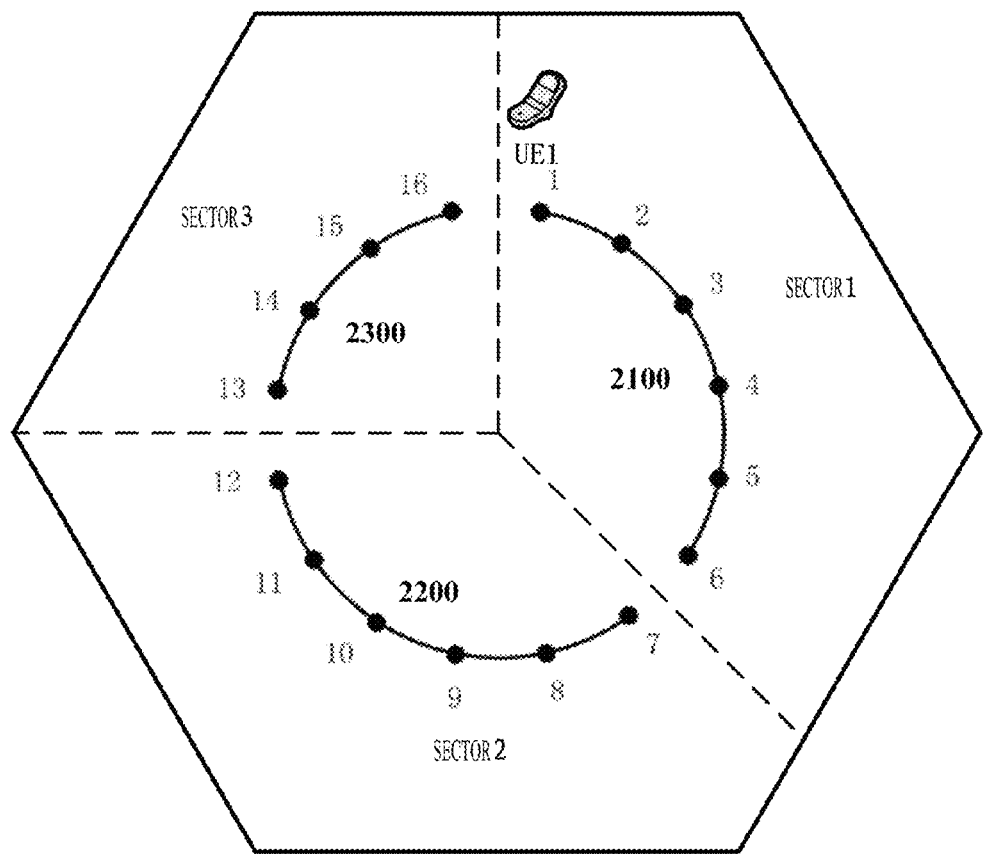
FIG. 2 illustrates a schematic view of a curved surface array antenna which may be used in an embodiment according to the present disclosure.

FIG. 2 illustrates a schematic view (a top view) of a Curved Surface Array (CSA) antenna 2000 which may be used in an embodiment according to the present disclosure. Three curved surface array antennas 2100, 2200, 2300 serve the sector 1, the sector 2 and the sector 3, respectively. Each curved surface array antenna has a plurality of columns of antenna elements in the vertical direction (a direction perpendicular to the paper in FIG. 2, while a direction perpendicular to the ground in a real system). For example, the curved surface array antenna 2100 is composed of 1st~6th columns of antenna elements, the curved surface array antenna 2200 is composed of 7th~12th columns of antenna elements, and the curved surface array antenna 2300 is composed of 13th~16th columns of antenna elements.

Respective columns of antenna elements of the curved surface array antenna 2100 may have, in the vertical direction, the same number of antenna elements which are aligned with each other. The curved surface array antenna 2100 may be a curved surface array antenna which may have uniform spaces in horizontal and vertical directions, and for example, both horizontal and vertical spaces between respective antenna elements may be 212. In addition, the curved surface array antenna 2100 may also be a horizontally uniform curved surface array antenna, and for example, it has uniform spaces in the horizontal direction, and has non-uniform spaces in the vertical direction. The non-uniform spaces in the vertical direction may be determined according to the manner disclosed in the patent application No. 201610051745.X, filed Jan. 26, 2016, entitled "NON-UNIFORM ANTENNA ARRAY AND SIGNAL PROCESSING THEREFOR", and assigned to the applicant of the present application, the entirety of which is incorporated herein by reference.

As shown in FIG. 2, it is assumed that UE1 is located at the boundary between the sector 1 and the sector 3. If the antenna 2100 is a planar array antenna, a beam toward UE1 transmitted from the antenna 2100 at this time has low gain, because the angle between the beam and the normal of the planar array antenna is large. However, if the antenna 2100 is a curved surface array antenna, one sub array may be obtained by dividing the curved surface array antenna in the vertical direction (for example, a sub array composed of the 1st and 2nd columns of antennas may be chosen), such that the sub array faces UE1 in a better way. Therefore, when the sub array is used to transmit the beam toward UE1, the beam can be perpendicular to the tangent plane of the sub array, and the beam has higher gain.

For example, the 2nd~4th columns of antenna elements constitute one sub array of the curved surface array antenna 2100. The sub array is in fact also a curved surface array antenna. One sub array may transmit a plurality of beams in different horizontal directions, which may have different gains and widths. The direction of a beam with the highest gain may be defined as the normal direction of the sub array, a plane which is perpendicular to the normal direction and tangent to the curved surface where the sub array is located is referred to as the tangent plane of the sub array. In a case where horizontal spaces between respective columns of antenna elements of the sub array are the same, the tangent plane of the sub array is parallel to a plane where two columns of antenna elements at the edges of the sub array are located. That is, with respect to a sub array composed of the 2nd~4th columns of antenna elements, the tangent plane thereof is parallel to a plane where 2nd, 4th columns of antenna elements are located, the normal direction thereof is perpendicular to the plane. The smaller the angle between the opposite direction of the normal direction of the sub array and the incident direction of the user signal, the better the sub array faces the user. In other words, when the normal direction of the sub array is parallel to the incident direction of the user signal, the sub array can provide the user equipment with a beam which has the highest gain.

With respect to a user equipment which is located at edge of the sector, it is also possible to choose antenna elements across sectors to serve the user equipment. For example, partial antenna elements of adjacent sectors constitute an array antenna which serves the user equipment. For example, with respect to UE1 in FIG. 2, an array antenna composed of two columns of antenna elements numbered as 1 and 2 in the curved surface array antenna 2100 which serves the sector 1 and two columns of antenna elements numbered as 15 and 16 in the curved surface array antenna 2300 which serves the sector 3 are chosen as an array antenna which serves UE1. A sub array composed of antenna elements across sectors may also constitute a curved surface array antenna.

In some embodiments, the sectors may be divided uniformly or non-uniformly. The curved surface array antennas 2100, 2200 and 2300 which serve different sectors may have the same size or have different sizes, i.e. have different number of antenna elements in the horizontal direction and/or in the vertical direction. In addition, curvatures of these three curved surface array antennas 2100, 2200 and 2300 may be the same or may be different. Although 3 curved surface array antennas are adopted in this example, in some embodiments, a larger or smaller number of curved surface array antennas may also be adopted, and the number of the sectors may also be increased or decreased accordingly. In addition, it is also possible to adopt combination of the curved surface array antennas and the planar array antennas, i.e. the curved surface array antennas are adopted in one or more sectors, and the planar array antennas are adopted in one or more other sectors.

A special form of curved surface array antenna is a columnar curved surface array antenna. Respective columns of antenna elements of the columnar curved surface array antenna form a cylinder, the cross section of the cylinder may be circular (e.g., a circularly columnar array antenna), elliptical (e.g., an elliptically columnar array antenna) or other approximately circular or elliptical closed shapes.

Figure 3A:
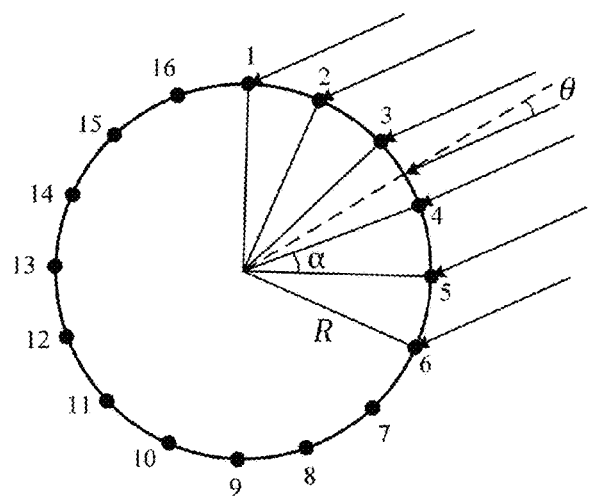
FIGS. 3A and 3B illustrate schematic views of a columnar curved surface array antenna which may be used in an embodiment according to the present disclosure.
Figure 3B:
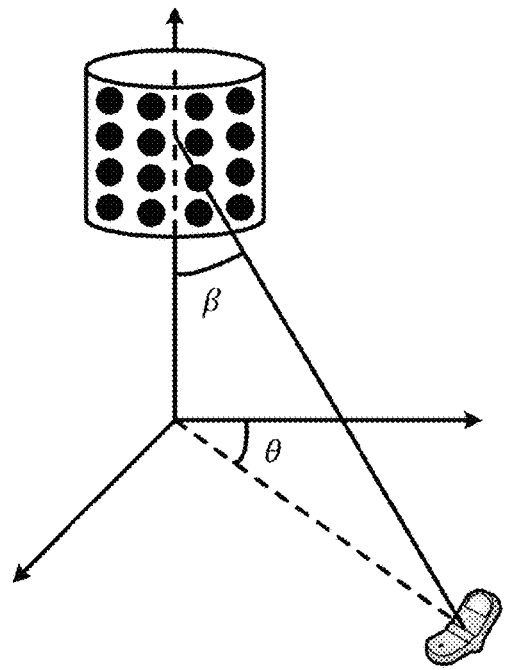

FIGS. 3A and 3B illustrate schematic views (FIG. 3A is a top view and FIG. 3B is a side view) of a Columnar Curved Surface Array (CCSA) antenna 3000 which may be used in an embodiment according to the present disclosure. Respective antenna elements of the CCSA antenna 3000 are approximately deployed at a side surface of a circular column. For example, the CCSA antenna 3000 has a plurality of columns of antenna elements in the vertical direction (a direction perpendicular to the paper), the plurality of columns of antenna elements approximately form a circular cylinder. For example, FIG. 3A exemplarily illustrates the CCSA antenna 3000 as having 16 columns of antenna elements in the vertical direction, these 16 columns of antenna elements form a circular cylinder which has a circular cross section.

The base station may choose one sub array (e.g., the 1st~6th columns of antenna elements) of the CCSA antenna 3000 to serve a certain user equipment. It is assumed that, the number of antennas in the horizontal direction in the sub array is Mx=6, the number of antennas in the vertical direction is My, where My may be any positive integer. Therefore, the total number of antennas in the sub array is Mx·My. Both the space Dx between antennas in the horizontal direction and the space Dy between antennas in the vertical direction may be chosen to be $\lambda/2$, and a radius R of a sectional circle of the circular column and an angle $\alpha$ between adjacent antennas may respectively be approximately expressed as:

$$R = \frac{\lambda M_x}{4\pi}, \quad \alpha = \frac{2\pi}{M_x}.$$

The base station may use the sub array to generate a directional beam to transmit downlink data to the user equipment. A channel matrix between the sub array and the user equipment may be expressed as a form of the following Kronecker product:

$$H = \Sigma_{l=1}^{L} \rho_l h_{a,l} \oplus h_{e,l}^T.$$

Wherein, L denotes a total transmission path, $\rho_l$ denotes a large scale fading coefficient of a $l_{th}$ path, $h_{a,l}$ and $h_{e,l}$ denote directional vectors in horizontal and vertical directions. According to distance differences between paths in horizontal and vertical directions of a signal arriving at respective antenna elements of the sub array, the directional vectors may be written as the following forms:

$$h_{a,l} = [f_+(M_x - 1), f_+(M_x - 3), \ldots ,$$
$$f_+(1), f_-(1), \ldots , f_-(M_x - 3), f_-(M_x - 1)]$$

$$h_{e,l} = \left[1, \ldots , e^{-j2\pi \frac{n}{2}\sin\beta_l}, \ldots , e^{-j2\pi \frac{(M_y-1)}{2}\sin\beta_l}\right],$$

where the function $f(\cdot)$ is defined as $$f_+(i) = e^{-j2\pi \frac{R}{\lambda} * i \frac{\alpha}{2} \sin(i \frac{\alpha}{2} + \theta_l)\cos(\beta_l)}$$
$$f_-(i) = e^{-j2\pi \frac{R}{\lambda} * i \frac{\alpha}{2} \sin(i \frac{\alpha}{2} - \theta_l)\cos(\beta_l)},$$

where $\theta_l$ and $\beta_l$ denote angles of arrival in horizontal and vertical directions of the $l_{th}$ path at the sub array, respectively. The sub array may be chosen such that the range of the horizontal angle of arrival $\theta$ of a direct path (a transmission path with the strongest energy) from the user equipment to the sub array is limited within a small region. As shown in FIG. 3A, the sub array may be chosen such that $$\theta \in \left[-\frac{\alpha}{2}, \frac{\alpha}{2}\right]. \quad \text{(Formula 1)}$$

In FIG. 3A, each arrow denotes an incident direction of a user signal transmitted along a certain path. As shown in FIG. 3B, the projection of the angle between the path and a straight line where the normal direction of the sub array as defined above is located on the horizontal plane is the horizontal angle of arrival $\theta$ of the path, the angle between the path and the tangent plane of the sub array (or the angle between the path and a direction perpendicular to the ground) is the vertical angle of arrival $\beta$ of the path. The smaller the horizontal angle of arrival of the user signal, the better the normal direction of the sub array aims at the user in the horizontal direction. Therefore, when a beam is transmitted in the opposite direction of the incident direction of the user signal, the beam may have higher gain and narrower width. In addition, in the case of using the CCSA antenna 3000, it is possible to choose a sub array which serves a user equipment according to the position of the user equipment or the measured channel direction, such that wherever the user equipment is located in the cell, it is possible to choose the sub array which serves the user equipment in such a way that the horizontal angle of arrival satisfies the above-mentioned Formula 1 as much as possible. Thereby, the problem of deterioration of communication quality of the user at edge of the sector using the conventional planar array antenna is alleviated.

In addition, beam-forming coefficients of the sub array may be chosen according to the following formula:

$$W(\theta, \beta) = \left( \frac{1}{\sqrt{M_x}} h_a(\theta, \beta) \otimes \frac{1}{\sqrt{M_y}} h_e^T(\beta) \right)^*,$$

where β and θ denote the vertical angle of arrival and the horizontal angle of arrival of the path with the strongest energy recognized by the base station among total L transmission paths. In a real system, it is also possible to adopt beam-forming based on a codebook. For example, $W(\theta, \beta)$ may be quantized and stored, then a codeword is choose by matching.

Hereinabove, general principles according to embodiments of the present disclosure are described. Hereinbelow, a communication system, a communication apparatus as well as a corresponding communication flow according to an embodiment of the present disclosure will be described in detail.

Figure 4:
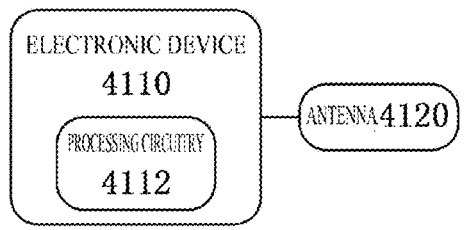
FIG. 4 illustrates a schematic view of a communication system according to an embodiment of the present disclosure.
Figure 4:
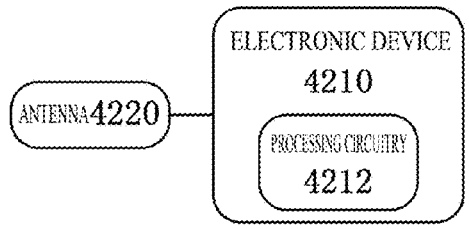

FIG. 4 illustrates a schematic view of a communication system 4000 according to an embodiment of the present disclosure. The communication system 4000 includes a communication apparatus 4100 and a communication apparatus 4200 which perform wireless communication with each other. The communication apparatus 4100 may include an electronic device 4110 and an antenna 4120. In addition, the communication apparatus 4100 may also include other components not shown, such as a radio frequency link, a baseband processing unit, a network interface, a processor, a memory, a controller, etc.

The electronic device 4110 may include processing circuitry 4112. In addition, the electronic device 4110 may also include an input/output interface and a memory, etc. The processing circuitry 4112 in the electronic device 4110 may output a signal (digital or analog) to other components in the communication apparatus 4100, may also receive a signal (digital or analog) from other components in the communication apparatus 4100. In addition, the processing circuitry 4112 may also control a part or all of operations of other components in the communication apparatus 4100.

The processing circuitry 4112 may be in the form of a general-purpose processor, may also be special-purpose processing circuitry, e.g. ASIC. For example, the processing circuitry 4112 can be configured by circuitry (hardware) or a central processing device (such as, a Central Processing Unit (CPU)). In addition, the processing circuitry 4112 may bear program (software) for causing the circuitry (hardware) or the central processing device to work. The program can be stored in a memory (such as, arranged in the communication apparatus 4100 or the electronic device 4110) or an external storage medium externally connected, or downloaded via a network (such as, Internet).

Although FIG. 4 illustrates that the electronic device 4110 and the antenna 4120 are separated, the electronic device 4110 may also be implemented to include the antenna 4120. In addition, the electronic device 4110 may also be implemented to include one or more other components in the communication apparatus 4100, or the electronic device 4110 may be implemented as the communication apparatus 4100 itself. In a real implementation, the electronic device 4110 may be implemented as a chip, a hardware component or an entire product.

The above description of the structure of the communication apparatus 4100 is applicable to the communication apparatus 4200 likewise, description of the detailed structure of the communication apparatus 4200 is no longer repeated herein. The communication system 4000 may be a cellular communication system, an apparatus-to-apparatus communication system, a self-organizing network or a cognitive radio system, etc.

In the cellular communication system, the communication apparatus 4100 may be implemented as the base station. For example, the communication apparatus 4100 may be implemented as any type of evolved Node B (eNB) such as a macro eNB (associated with a macro cell) or a small eNB (associated with a small cell). The small eNB may be an eNB that covers a cell, such as a pico eNB, a micro eNB, or a home (femto) eNB, smaller than the macro cell. Instead, the communication apparatus 4100 may be implemented as any other type of base station, such as a network node in a next generation network, e.g., a gNB, a NodeB and a base transceiver station (BTS). The communication apparatus 4100 may include a main body (also referred to as a base station device) configured to control wireless communication and one or more remote radio heads (RRHs) disposed at different locations from the main body. Further, various types of terminals to be described below may operate as the communication apparatus 4100 by performing a base station function temporarily or semi-permanently.

The communication apparatus 4200 may be implemented as a terminal device or a user equipment. For example, the communication apparatus 4200 may be implemented as a mobile terminal such as a smartphone, a tablet personal computer (PC), a notebook PC, a portable game terminal, a portable/dongle mobile router and a digital camera, or an in-vehicle terminal such as a car navigation device. The communication apparatus 4200 may further be implemented as a terminal that performs machine to machine (M2M) communication (also referred to as a machine type communication (MTC) terminal). Furthermore, the communication apparatus 4200 may be a wireless communication module (such as an integrated circuit module including a single wafer) mounted on each of the above terminals.

Hereinbelow, processing of the communication apparatuses 4100 and 4200 will be described in a case where it is assumed that the communication apparatus 4100 is a base station and the communication apparatus 4200 is a user equipment. It is noted that in a case where the communication apparatus 4100 is not a base station and the communication apparatus 4200 is not a user equipment, the communication apparatuses 4100 and 4200 may also execute the processing described below. In addition, a part or all of the processing executed by the communication apparatuses 4100 and 4200 described below may be executed by the processing circuitry 4112 and 4212, may also be executed by the processing circuitry 4112 and 4212 controlling other components in the communication apparatuses 4100 and 4200.

2. Processing of Base Station

The base station may be equipped with the columnar curved surface array antenna 3000 in FIG. 3A. The base station may also be equipped with the curved surface array antenna 2000 in FIG. 2. In order to simplify description of embodiments, hereinafter, taking the base station being equipped with the columnar curved surface array antenna 3000 as an example, explanation is made. After those skilled in the art in read the present specification, they may make adaptive modifications to operations on the columnar curved surface array antenna and then apply them to the curved surface array antenna.

Upon communication with a certain user equipment, the base station may not use all of the antenna elements in the columnar curved surface array antenna 3000. For example, the base station may determine a certain sub array of the columnar curved surface array antenna 3000 to serve the user equipment. For example, the base station may determine the sub array to serve the user equipment according to a channel state between antennas associated with the base station and the user equipment. By transmitting a beam-formed downlink reference signal to perform beam training, for example, the base station may obtain a downlink channel state between the base station and the user equipment according to feedback from the user equipment. By receiving a reference signal from the user equipment, the base station may also obtain an uplink channel state between the base station and the user equipment based on the reference signal. In an example in which uplink and downlink channels have reciprocity, e.g. a TDD system, the base station may determine the channel state by either of them, and determine that both downlink transmission and uplink reception use the same sub array to serve the user equipment. In an example in which uplink and downlink channels do not have reciprocity, e.g. some FDD systems, the base station may determine the sub array for downlink transmission by downlink beam training, and additionally determine the sub array for uplink reception by uplink channel estimation. In a case where there is a line-of-sight channel between the base station and the user equipment, for example, the base station may also determine the direction of the channel according to the geographical position of the user equipment, so as to adopt the method of the present disclosure to select the sub array to serve the user equipment.

FIG. 5 illustrates a schematic view of performing beam training in an embodiment according to the present disclosure. In a downlink beam training process, as shown in FIG. 5, the base station may transmit a plurality of beams in different directions (e.g., beams 5100, 5200, 5300) at a beam training stage by using different sub arrays via the columnar curved surface array antenna 3000, i.e. beam-formed downlink reference signals in different directions. Then, the base station may receive feedback information of these beams from the user equipment, the feedback information may include channel states corresponding to these beams. Thereby, the base station may determine the sub array to serve the user equipment based on feedback information.

For example, feedback information from the user equipment may include beam indication, the beam indication includes indication of a beam of the plurality of beams with a best channel quality (which may also be called an optimum beam), e.g., a CSI-RS resource indicator CRI (the base station uses different transmission resources to transmit beam-formed CSI-RSs, i.e. BF-CSI-RSs, in different directions, and the user equipment feeds back the CRI to indicate the beams). The base station may determine the sub array to serve the user equipment based on the sub array corresponding to the transmitted beam with the best channel quality (BS Tx Beam). For example, the base station may determine the sub array corresponding to the beam with the best channel quality as the sub array to serve the user equipment. In addition, the base station may adjust the size of the sub array corresponding to the beam with the best channel quality, and then use it as the sub array to serve the user equipment.

In a high frequency communication system of the next generation, e.g. millimeter wave, uplink beam training may also be included. Similar to the above-mentioned downlink beam training of the present disclosure, the base station may receive uplink reference signals from the user equipment in different directions at a training stage by using different sub arrays via the columnar curved surface array antenna 3000, the base station may determine the sub array with a best reception channel quality as the sub array to serve the user equipment. In one specific example, the base station uses reception beams (BS Rx Beams) corresponding to different sub arrays to receive uplink reference signals transmitted on different transmission beams (UE Tx Beams) of the user equipment via the columnar curved surface array antenna 3000.

The sub array of the columnar curved surface array antenna is still a curved surface array antenna. For example, the sub array may be composed of a plurality of adjacent columns of antenna elements of the columnar curved surface array antenna 3000 (e.g., 1st~6th columns of antenna elements). Therefore, the sub array has a same number of antenna elements in the vertical direction as the columnar curved surface array antenna, and antenna elements of the sub array in the horizontal direction are composed of a plurality of adjacent antenna elements of the columnar curved surface array antenna in the horizontal direction.

The base station may divide the columnar curved surface array antenna into a plurality of the sub arrays longitudinally, these sub arrays may overlap (i.e. have common antenna elements) or be adjacent (i.e. not have common antenna elements). Sizes of these sub arrays may be the same, may also be different. The base station may use these sub arrays to transmit a plurality of beams in different directions (e.g., in the horizontal directions). For example, the base station may allocate a dedicated reference signal resource for each of the sub arrays, so as to transmit beam-formed reference signals in different horizontal directions (e.g., BF-RS). Since beams transmitted by different sub arrays may use different resources (for example, may use different resource elements REs in LTE physical resources), upon receiving these beams, the user can distinguish between these beams.

The size of the sub array may be predetermined, may also be dynamically selected. For example, the base station may determine the size of the sub array to be 6 (may also be other values), use the 1st~6th columns of antennas to transmit the beam 5100, use the 2nd~7th columns of antenna elements to transmit the beam 5200, use the 3rd~8th columns of antenna elements to transmit the beam 5300, and so on (adjacent sub arrays are staggered by one column of antenna elements). The columnar curved surface array antenna 3000 has 16 sub arrays with the horizontal size of 6 (has 6 antenna elements in the horizontal direction), thus may transmit 16 beams in different directions.

The above-mentioned beam training method is a refined beam training method, because it uses all possible sub arrays to perform beam training, so that a beam with the optimum channel quality may be obtained comparatively accurately. In some embodiments, a rough beam training method may also be adopted, i.e. not all of the sub arrays are used to perform beam training. For example, it is possible to use 1st~6th columns of antennas to transmit the beam 5100, use 3rd~8th columns of antenna elements to transmit the beam 5300, and so on (adjacent sub arrays are staggered by two columns of antenna elements). The rough beam training method may save signaling resources, improve efficiency of beam training, and reduce occupation of resources. In addition, it is also possible to adopt a more rough beam training method, e.g. adjacent sub arrays are staggered by three or even more columns of antenna elements.

When the user equipment receives these beams, it may measure reception quality (i.e. the channel quality) of these beams, then feed back reception quality (e.g. CQI, RSSI) of each beam to the base station, e.g. include CRI, reception quality information in the feedback message. Instead, the user may select a beam with the best reception quality, then feed back information of the beam (e.g., a number of the beam such as CRI) to the base station. In the above-mentioned example, the message fed back to the base station by the user may further include channel state information, e.g., PMI, RI, to improve space division gain. In addition, in some examples, indication of a number/ID of a beam is associated with a transmission resource position occupied by a corresponding feedback message, so that it is implicitly included in the feedback message, and does not necessarily correspond to a transmission bit.

It is assumed that feedback information from the user equipment indicates the beam 5300 has the best channel quality. Since the beam 5300 is transmitted by the base station using the sub array composed of 3rd~8th columns of antenna elements, the base station may determine the sub array composed of 3rd~8th columns of antenna elements as the sub array to serve the user equipment. Instead, in order to make overall performance of the system optimal, the base station may also select a sub array corresponding to a beam with a second best channel quality for the user. This may be adjusted by those skilled in the art in a specific implementation according to an optimization objective.

In addition, based on the sub array determined as above, the base station may adjust (e.g., increase or decrease) the size of the sub array according to the channel state between the base station and the user equipment. For example, if based on feedback information from the user equipment, the base station finds that the channel quality of the beam with the best channel quality is still low (for example, CQI included in feedback information is below a certain threshold value), the base station may increase the size of the sub array to serve the user equipment. For example, the base station may increase the same number of columns of antenna elements on both sides of 3rd~8th columns of antenna elements in the horizontal direction. For example, the base station may determine the sub array composed of 2nd~9th columns or 1st~10th columns of antenna elements as the sub array to serve the user equipment.

A beam-forming parameter (e.g. a beam vector) which is needed to be used when transmitting/receiving the beam-formed reference signal may be determined according to a target direction (e.g., a target horizontal direction). When the sub arrays of the same size are used to transmit and receive beams at the beam training stage, it is possible to make each of the sub arrays transmit a beam perpendicular to the tangent plane direction of the sub array (i.e. in the normal direction). Thus, when these sub arrays transmit and receive beams, they may use the same beam-forming parameter to perform beam-forming on the reference signals. In addition, if it is necessary to make the sub array transmit a beam in a non-normal direction, it is possible to change the beam-forming parameter according to the target horizontal direction.

When the sub arrays of the columnar curved surface array antenna are used to transmit and receive beams, it is possible to make the directions of the beams aim at the normal directions of the sub arrays, so that it is possible to make the transmitted beams have the largest gains and the narrowest widths. This is different from the conventional planar array antenna. The conventional planar array antenna uses the entire array antenna to transmit beams in different directions, these beams have different gains due to their different angles with the planar array antenna, so that beams toward the users at edges of the sectors have lower gains. In an embodiment of the present disclosure, it is possible to choose different sub arrays of the columnar curved surface array antenna to transmit and receive beams in different directions, and since these sub arrays have the same size, and these beams go along the normal directions of the sub arrays, these beams have the same gain, and do not have gains reduced due to different angles, so that reduction of gains of the beams of the users at edges of the sectors is avoided.

In addition, in the case of using the columnar curved surface array antenna according to an embodiment of the present disclosure, it is not necessary to divide fixed sectors, because it is possible to choose a sub array for a certain user equipment within a range of 360 degrees, and there is always one sub array which can face the user better, i.e. the normal direction of the sub array faces the user better, which also means that a beam of comparatively high gain can be provided.

Hereinabove, the method of determining the sub array to serve the user equipment by performing beam training is introduced in detail. Instead, it is possible to determine the sub array to serve the user equipment according to the uplink channel direction of the user equipment or the position of the user equipment. For example, the base station may determine the uplink channel state from the user equipment to the base station according to the received uplink signal, e.g., uplink channel quality, uplink channel direction (angle of arrival), etc. Then, the base station may determine the sub array to serve the user equipment according to the uplink channel direction of the user equipment, e.g. make the arrive direction of the user signal approximately perpendicular to the tangent plane of the sub array on which the user signal is incident. In addition, after the user position is determined, it is possible to determine the sub array to serve the user equipment by making the normal direction of the sub array aim at the user equipment optimally (e.g., the angle between the normal direction and a line connecting the user equipment and the columnar curved surface array antenna is minimal). For example, it is possible to choose antenna elements near the line connecting the user equipment and the columnar curved surface array antenna to constitute the sub array to serve the user equipment.

In addition, the base station may determine spatial processing parameters for the sub array to serve the user equipment, according to a direction corresponding to the beam with the best channel quality, e.g., combination coefficients of a radio frequency circuit and an antenna in baseband beam-forming, phase, amplitude of an antenna in analog beam-forming, etc. For example, it is possible to perform quantization on W(θ, β) given above to obtain a codebook which includes a plurality of codewords, then select a codeword from the codebook according to the direction corresponding to the beam with the best channel quality, thereby determine spatial processing parameters of the sub array to serve the user equipment. If the sub array corresponding to the beam with the best channel quality is directly determined as the sub array to serve the user equipment, it is possible to determine spatial processing parameters of the sub array directly according to the codeword corresponding to the sub array. Instead, if the size of the sub array is adjusted on the basis of the sub array corresponding to the beam with the best channel quality, it is possible to determine spatial processing parameters of the sub array according to the codeword corresponding to the adjusted sub array.

After the sub array to serve the user equipment is determined, the base station may transmit the channel state information reference signal to the user equipment via the sub array, e.g. the conventional CSI-RS not subject to beam-forming. When the user equipment receives the channel state information reference signal, it may use the reference signal to measure the channel state between it and the base station, and transmit, to the base station, a report based on the channel state information reference signal, e.g. information such as PMI, RI, CQI. After the base station obtains the report from the user equipment, it may determine a transmission scheduling scheme for the user equipment based on the report (e.g., precoding, modulation and coding, transmission resources for the user equipment), and use the determined sub array to transmit data to the user equipment.

Hereinabove, how the base station selects a sub array for a single user equipment has been described. In addition, the base station may communicate with a plurality of user equipments on the same resource (e.g., time frequency resource, such as resource element RE, resource block RB in LTE physical resources). In this case, the base station may determine which user equipments may communicate with the base station on the same resource (e.g., the user scheduling), and determine the sub arrays to serve these user equipments respectively.

For example, the base station has already determined an optimal beam of each user equipment, these optimal beams correspond to the corresponding sub arrays, respectively. The base station may put user equipments with a large angle/separating degree into one group, and schedule them to be served by the same resource. For example, when the base station receives feedback information from a plurality of user equipments, it may perform scheduling, such that user equipments whose optimal beams are close to each other (with a small separating degree) do not use the same resource, and such that user equipments with a large separating degree of optimal beams use the same resource. FIGS. 6A and 6B illustrate a schematic view of grouping users in an embodiment according to the present disclosure. As shown in FIG. 6A, the base station may put UE2, UE4, UE6 into one group, and determine that they may use the same resource, i.e. the base station may serve UE2, UE4, UE6 on the same resource. In addition, as shown in FIG. 6B, the base station may put UE1, UE3, UE5 into one group, and determine that it serves UE1, UE3, UE5 on another resource. Such a scheduling method has interference between users using the same resource reduced, and communication quality is improved.

The sub arrays corresponding to the above-mentioned user equipments which multiplex the same resource may not overlap, may also have a part of antenna elements which overlap. In some embodiments, the sub arrays to serve the user equipments which use the same resource may have common antenna elements. For example, a single antenna element may be connected to one or more radio frequency links. In a case where a single antenna element is connected to a plurality of radio frequency links, the sub arrays which have common antenna elements may simultaneously transmit beams in different directions. At this time, the base station may directly determine the sub array corresponding to the optimal beam as the sub array to serve the user equipment. Further, for example, in an application scenario in which the antenna element and the radio frequency link correspond to each other in a one-to-one manner, the base station may use baseband precoding to perform spatial division multiplexing, so that it uses the same antenna sub array and resource to serve a plurality of user equipments.

In a case where the base station determines that the sub arrays to serve the user equipments which use the same resource can not have common antenna elements, the base station may adjust (e.g., increase or decrease) the sizes of the sub arrays corresponding to the optimal beams of one or more of those user equipments. In the foregoing example, the base station sets the initial horizontal size of the sub array to be 6. But in FIG. 6A, since 3 user equipments need to be served simultaneously and the initial horizontal size of the sub array corresponding to the optimal beam of each user equipment is 6, the sub arrays corresponding to optimal beams of these 3 user equipments have common antenna elements. Therefore, it is necessary to decrease the size of a sub array to serve a certain user equipment. For example, the base station may reduce the size of the sub array of the user equipment with the optimum channel quality, because even the size of the sub array of the user equipment is reduced, the channel quality thereof may be slightly reduced, and will not become too bad. It is assumed that the base station reduces the horizontal size of the sub array to serve UE4 from 6 to 4 (1 column of antenna elements is reduced at each of both sides), then the sub arrays of UE2, UE4, UE6 doe not have common antenna elements, the sub arrays which are adjusted in such a way may function as final sub arrays to serve these three user equipments. As shown in FIG. 6A, 6 antenna elements denoted with hollow circles serve UE2, 4 antenna elements denoted with solid circles serve UE4, 6 antenna elements denoted with squares serve UE6.

In addition, the base station may also put user equipments which have medium channel quality into one group and determine that they use the same resource, put user equipments which have better channel quality and user equipments which have worse channel quality into one group and determine that they use another resource. With respect to user equipments which have worse channel quality, they may need to increase the sizes of the sub arrays corresponding to optimal beams. If user equipments which have worse channel quality and user equipments which have better channel quality are put into one group, it is possible to reduce the sizes of the sub arrays of user equipments which have better channel quality, and increase the sizes of the sub arrays of user equipments which have worse channel quality, and ensure that the sub arrays which are needed to serve do not have common antenna elements.

As described above, after the sizes of the sub arrays to serve the user equipments are adjusted, the sub arrays of the user equipments which use the same resource may have different sizes. In addition, the above described beam training stage uses sub arrays of the same size to transmit training beams, but instead, may also use sub arrays of different sizes to transmit training beams.

In some embodiments, the base station may also determine the sub array to serve the user equipment based on a business category of the user equipment. For example, with respect to a user equipment using a voice or video business, the base station may accordingly increase the size of the sub array thereof, because the voice or video business has a comparatively high requirement for communication quality. But with respect to a user equipment using a short message or webpage browse business, the base station may accordingly reduce the size of the sub array thereof, because the short message and webpage browse business has a comparatively low requirement for communication quality.

Figure 7:
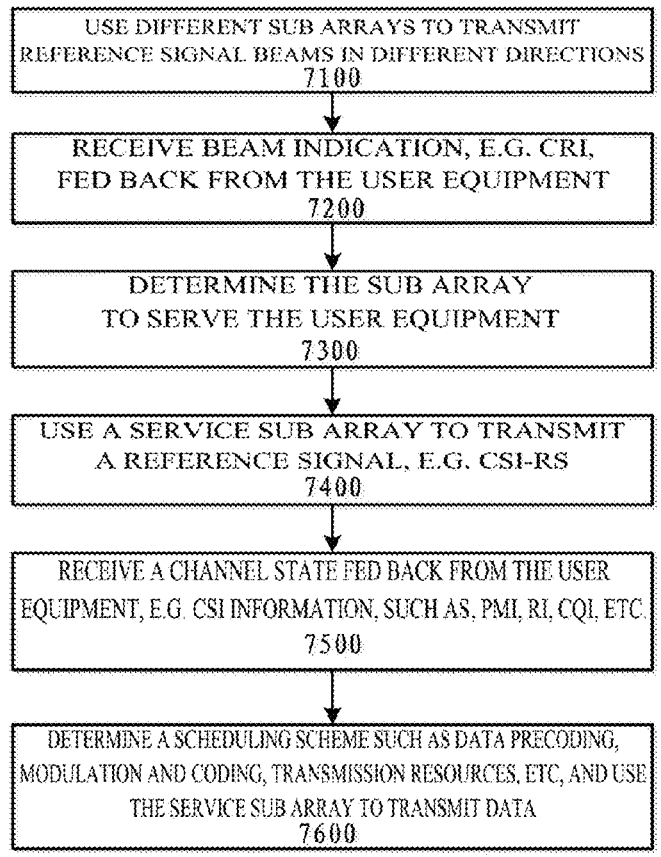
FIG. 7 illustrates a processing flow of a base station according to an embodiment of the present disclosure.

FIG. 7 illustrates a processing flow of a base station according to an embodiment of the present disclosure. Before step 7100, the base station may optionally first broadcast downlink system information, including e.g. a number of downlink beams, a frame structure, a cell number, a beam training parameter, etc. In step 7100, the base station may use different sub arrays to transmit reference signal beams in different directions. In step 7200, the base station may receive beam indication fed back from the user equipment, e.g. CRI. In step 7300, the base station may determine the sub array to serve the user equipment based on the received feedback from the user equipment. In step 7400, the base station may use the determined sub array (it may become a service sub array) to transmit a reference signal to the user equipment, e.g. CSI-RS. In step 7500, the base station may receive channel state related information from the user equipment, e.g. CSI information, including e.g. PMI, RI and CQI, etc. In step 7600, the base station may, based on channel state related information received from the user equipment, determine a scheduling scheme for the user equipment such as data precoding, modulation and coding, transmission resources, etc, then use the service sub array to transmit data. Specific implementations of these steps have been already described above, description thereof is no longer repeated herein.

In addition, the base station may execute a signal processing method. The method determines a sub array of a columnar curved surface array antenna of a base station to serve a target communication apparatus, based on a channel state and/or a business category between the columnar curved surface array antenna and the target communication apparatus. In addition, the method may also include executing steps of one or more processing described above with respect to the base station.

In addition, the base station may execute a communication method. The method may include dividing a curved surface array antenna into a plurality of overlapping or adjacent sub arrays longitudinally. The method may also include allocating a dedicated reference signal resource for each of the sub arrays, so as to transmit beam-formed reference signals in different horizontal directions. In addition, the method may also include executing steps of one or more processing described above with respect to the base station.

Hereinabove, the processing at the base station side is described, and a processing at the user side will be described next.

3. Processing of User Equipment

The user equipment may determine the channel state between the electronic device and the base station. The user equipment may transmit information including the channel state and/or the business category to the base station, such that the base station can determine the sub array of the columnar curved surface array antenna at the base station side to perform communication with the user equipment.

For example, the user equipment may receive a plurality of beams in different directions transmitted from the columnar curved surface array antenna. The user equipment may estimate reception quality of these beams, and include channel states corresponding to the plurality of beams into the information transmitted to the base station. In some embodiments, the user equipment may include indication of a beam of the plurality of beams with the best channel quality into the information transmitted to the base station.

In an example in which the uplink reference signal is provided for the base station to estimate the channel direction, the user equipment transmits the uplink reference signal based on uplink reference signal configuration information of the base station according to corresponding periods and transmission resources, so that the base station performs corresponding measurement and determines the service antenna sub array.

In an example of a high frequency communication system, in a process of auxiliary downlink beam training, the user equipment uses different reception beams (UE Rx Beam) to configure its antenna arrays so as to receive beams transmitted from different sub arrays of the base station (BS Tx Beam), as well as feed back the result of downlink beam sweep so that the base station determines the service antenna sub array; in a process of auxiliary uplink beam training, the user equipment uses different transmission beams (UE Tx Beam) to configure its antenna arrays so as to transmit the uplink reference signal to the base station, so that the base station uses reception beams (BS Rx Beam) of different sub arrays to perform measurement as well as determine the service antenna sub array.

Figure 8:
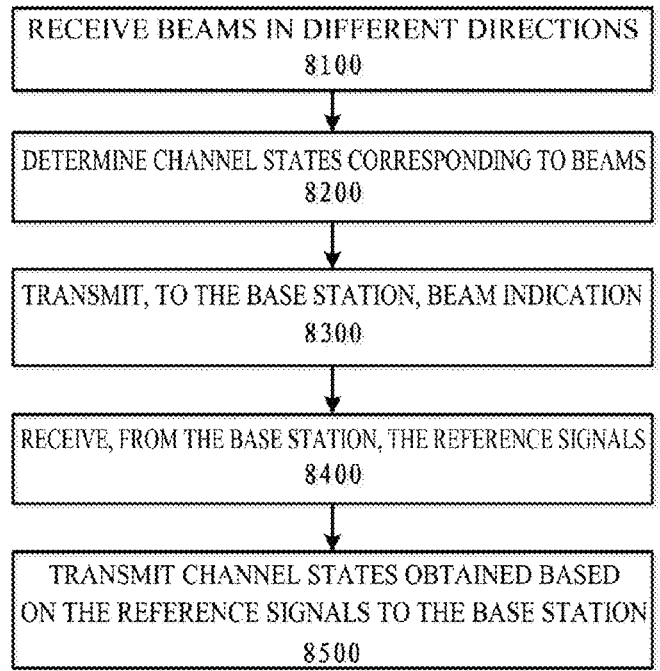
FIG. 8 illustrates a processing flow of a user equipment according to an embodiment of the present disclosure.

FIG. 8 illustrates a processing flow of a user equipment according to an embodiment of the present disclosure. In step 8100, the user equipment may receive a plurality of beams in different directions from the base station, e.g., beam-formed reference signals transmitted in different horizontal directions by a plurality of sub arrays at the base station side using dedicated reference signal resources. In step 8200, the user equipment may determine channel states corresponding to beams, for example, estimate channel states corresponding to different horizontal directions (i.e. corresponding to different beams) based on beam-formed reference signals. In step 8300, the user may transmit, to the base station, beam indication, e.g. information including CRI, etc. In step 8400, the user may receive, from the base station, the reference signals, e.g. the conventional CSI-RS not subject to beam-forming. In step 8500, the user may re-determine channel states based on the reference signals received in step 8400, and transmit channel state related information (e.g. information including PMI, CQI, RI, etc) to the base station, such that the base station can further determine a transmission scheduling scheme for the user equipment.

In addition, the user equipment may execute a communication method. The method may include determining a channel state between an antenna associated with an electronic device and a base station. The method may also include transmitting information including the channel state and/or the business category to the base station, such that the base station can determine the sub array of the columnar curved surface array antenna associated with the base station pass to perform communication with the user equipment. In addition, the method may also include executing steps of one or more processing described above with respect to the user equipment.

4. Simulation Result

Hereinabove, a communication apparatus and a corresponding method according to embodiments of the present disclosure are described. Hereinafter, a simulation result of a scheme according to an embodiment of the present disclosure in a specific scene is given.

Consider a single-cell multi-user scene, and compare beam widths, beam gains and user reception signal intensities of two schemes of UPA and CCSA. Hereinafter, system parameters of the two schemes are listed below:

UPA: 3 UPAs are deployed at the base station, each covers a 120° region; a horizontal direction antenna number of each UPA is $M_x=12$; a vertical direction antenna number of each UPA is $M_y=8$; a total number of antennas of the base station is 288; a distance between adjacent antennas is $D_x=D_y=\lambda/2$; there is a single path channel between the user equipment and the base station; each UPA can generate 12 beams in different directions in the horizontal direction, there are a total of 36 beams.

CCSA: 1 CCSA is deployed at the base station, covers an entire 360° region; a horizontal direction antenna number is $M_x=36$; a vertical direction antenna number is $M_y=8$; a total number of antennas of the base station is 288; a distance between adjacent antennas is $D_x=D_y=\lambda/2$; there is a single path channel between the user equipment and the base station; it can generate 36 beams in different directions in the horizontal direction.

For the sake of simplicity, it is assumed that the vertical angles of arrival of all the user equipments are $\beta=50°$. Both schemes of UPA and CCSA are equipped with 288 antennas, can generate 36 beams in different directions in the horizontal direction.

Figure 9:
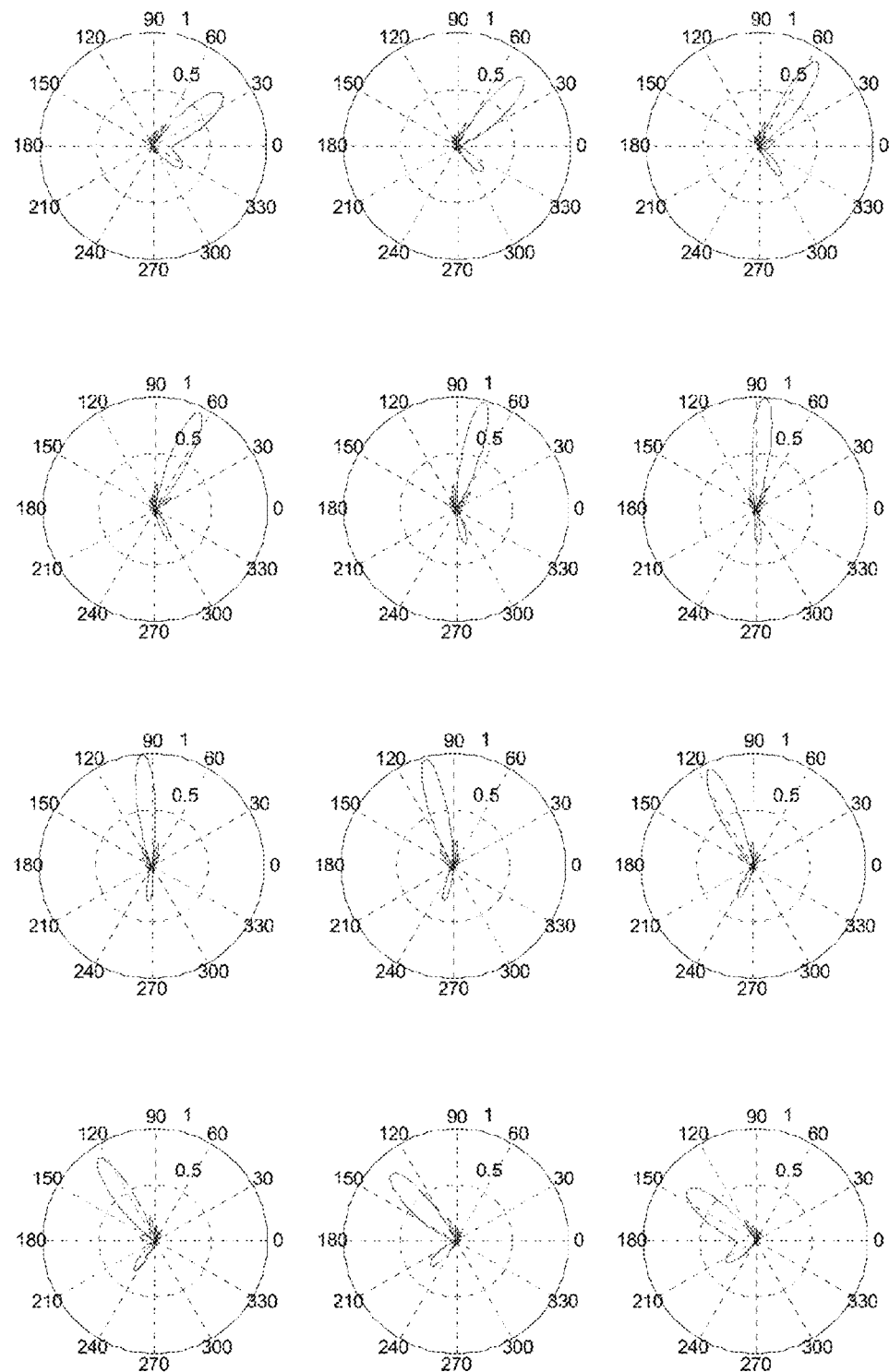
FIG. 9 illustrates beam patterns of a conventional planar array antenna.

FIG. 9 illustrates beam patterns of a conventional planar array antenna. In FIG. 9, 1 UPA provides beam coverage within a 120° region (30°~150°), will generate a total of 12 beams. It is not difficult to find that, when getting close to the UPA panel vertical angle (90°), the beam has relatively strong gain and is relatively narrow, has good directivity. However, when getting away from the vertical angle (getting close to 30° or getting close to 150°), the beam has relatively small gain and is relatively wide, performance is significantly reduced. In this case, when the user is located at the edges within the sector of 30°~150°, beam gain which the base station provides for it is relatively low, and the beam is relatively wide (it easily causes interfere between beams). This is an unavoidable defect when performing multibeam covering based on the UPA architecture, i.e. performance is reduced at edge of the sector.

Figure 10:
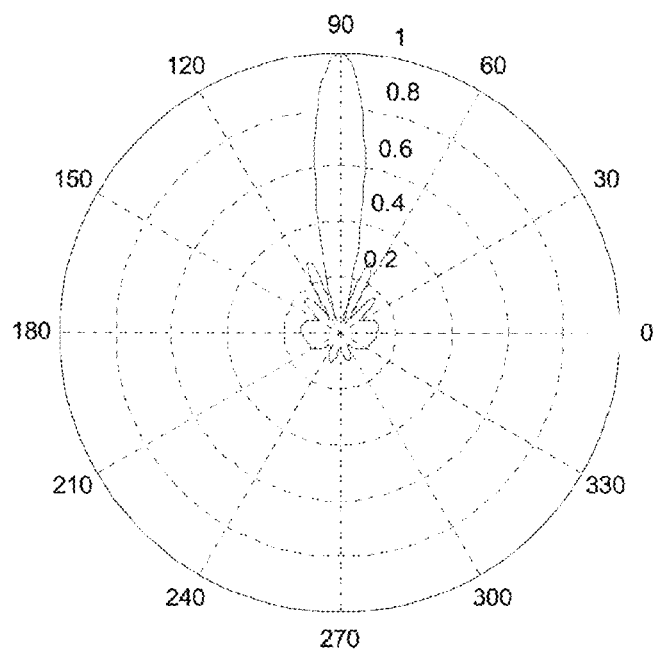
FIG. 10 illustrates a beam pattern of a columnar curved surface array antenna according to an embodiment of the present disclosure.

FIG. 10 illustrates a beam pattern of a columnar curved surface array antenna according to an embodiment of the present disclosure. FIG. 10 gives a shape of a directional beam generated by a specific sub array (with a size of 12×8) in CCSA. In order to be compared with UPA fairly, there may be a total of 36 (a horizontal direction antenna number 36) sub arrays (with a size of 12×8), therefore CCSA can also generate a total of 36 directional beams, and in one time slot, there may be 3 sub arrays (no antenna element is repeatedly used) which simultaneously generate 3 directional beams, like the UPA architecture. Unlike UPA, beams based on the CCSA architecture are uniform in any direction, include the same beam width and beam gain, this is decided by isotropy of CCSA. Therefore, in comparison with the problem of reduction in performance at edge of the sector in the UPA architecture, the user in the CCSA architecture may obtain service of a beam with the same performance in any position.

Figure 11:
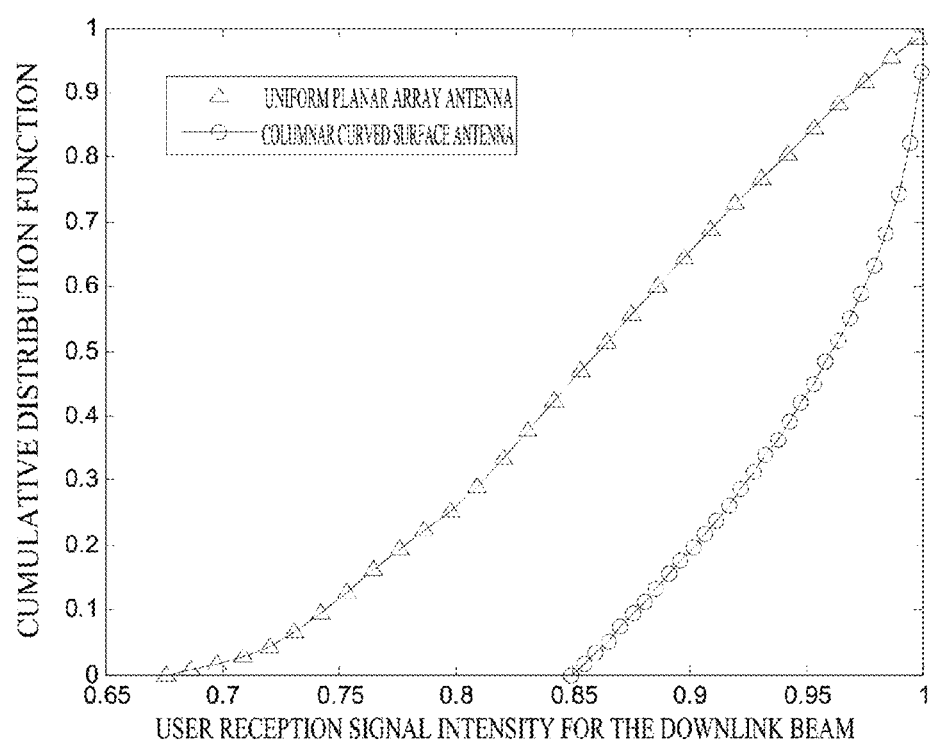
FIG. 11 illustrates a simulation result of comparing a columnar curved surface array antenna according to an embodiment of the present disclosure with a conventional planar array antenna.

FIG. 11 illustrates a simulation result of comparing a columnar curved surface array antenna according to an embodiment of the present disclosure with a conventional planar array antenna. It gives comparison of user reception signal intensities for downlink beam in the uniform planar array antenna (UPA) and the columnar curved surface array antenna (CCSA), the reception intensities are normalized (the maximum is 1). User equipments are randomly distributed within a cell, a cumulative distribution function chart is obtained through statistics of 10000 user random distributions. From the chart, it is not difficult to find that, under the UPA architecture, the user reception signal intensities for the downlink beam when the user equipment is located in different positions have large differences, this is mainly caused by poor performance of the user equipment at edge of the sector. But, under the CCSA architecture, the worst user performance also reaches 85% of the best user performance. The reason why certain user performances do not reach the best user performance is that, the direction resolution of the 36 beams is 10°, and therefore, users within the 10° range have some performance differences, but in comparison with the UPA architecture, such differences have already been greatly reduced.

Considering that a radius of a real cell is approximately 200 meters (a micro cell) to 500 meters (a macro cell), under the current frequency (2 GHz or so), the angle of arrival of the channel from the user to the base station will become large because of refraction, scattering of the signal (approximately for 5~10°). Therefore, with respect to the base station, it is enough to control the transmitted directional beam within the accuracy of 10° (if finer, it already exceeds the angle spread of the channel itself). Therefore, the base station is equipped with 24 antennas in the horizontal direction, and the resolution of the beam in the horizontal direction reaches 360°/24=15°, which is basically already enough.

5. Application Examples

[5-1. Application Examples Regarding Base Stations]

First Application Example

Figure 12:
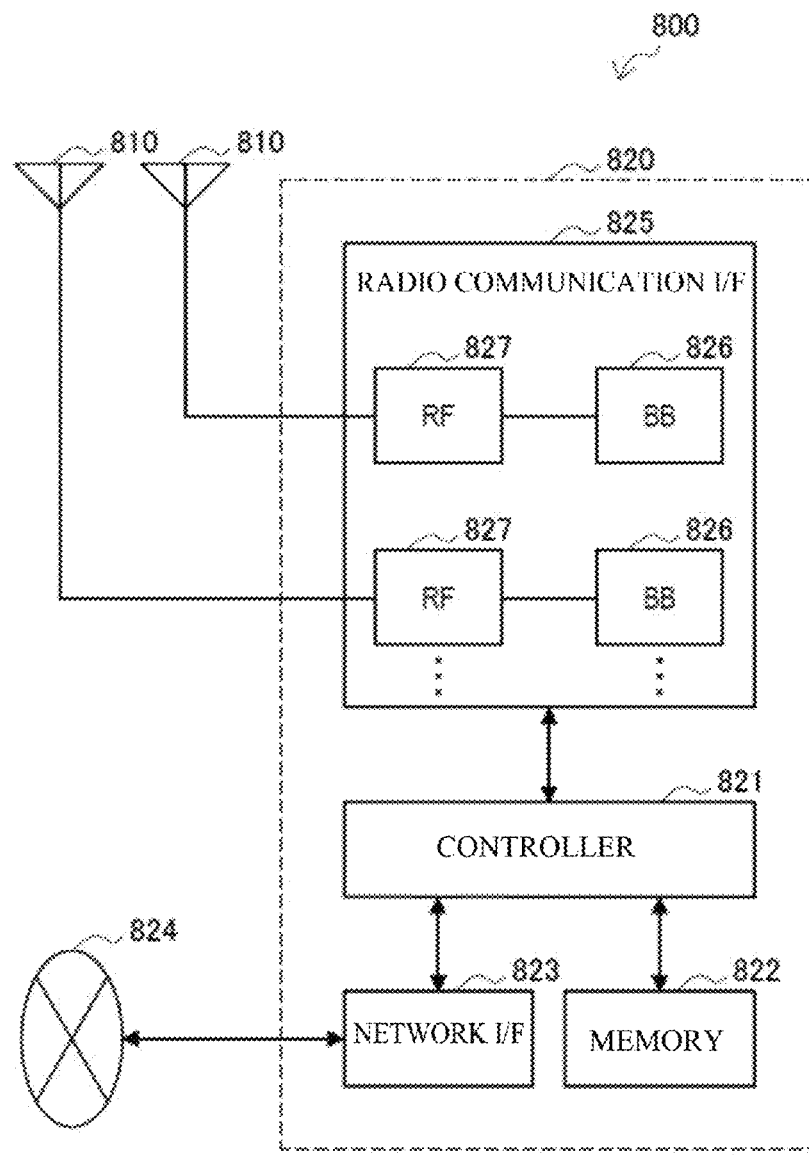
FIG. 12 is a block diagram illustrating a first example of a schematic configuration of an eNB.

FIG. 12 is a block diagram illustrating a first example of a schematic configuration of an eNB to which the technology of the present disclosure may be applied. An eNB 800 includes a plurality of antennas 810 as well as a base station device 820. The base station device 820 and each antenna 810 may be connected to each other via an RF cable.

Each of the antennas 810 includes a single or multiple antenna elements (such as multiple antenna elements included in an multiple input multiple output (MIMO) antenna), and is used for the base station device 820 to transmit and receive wireless signals. The eNB 800 may include the multiple antennas 810, as illustrated in FIG. 12. For example, the multiple antennas 810 may be compatible with multiple frequency bands used by the eNB 800. The multiple antennas 810 are arranged as the antenna array in the above-mentioned example of the present disclosure, e.g. the columnar curved surface antenna array.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 12. For example, the multiple BB processors 826 may be compatible with multiple frequency bands used by the eNB 800. The wireless communication interface 825 may include the multiple RF circuits 827, as illustrated in FIG. 12. For example, the multiple RF circuits 827 may be compatible with multiple antenna elements. Although FIG. 12 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 13:
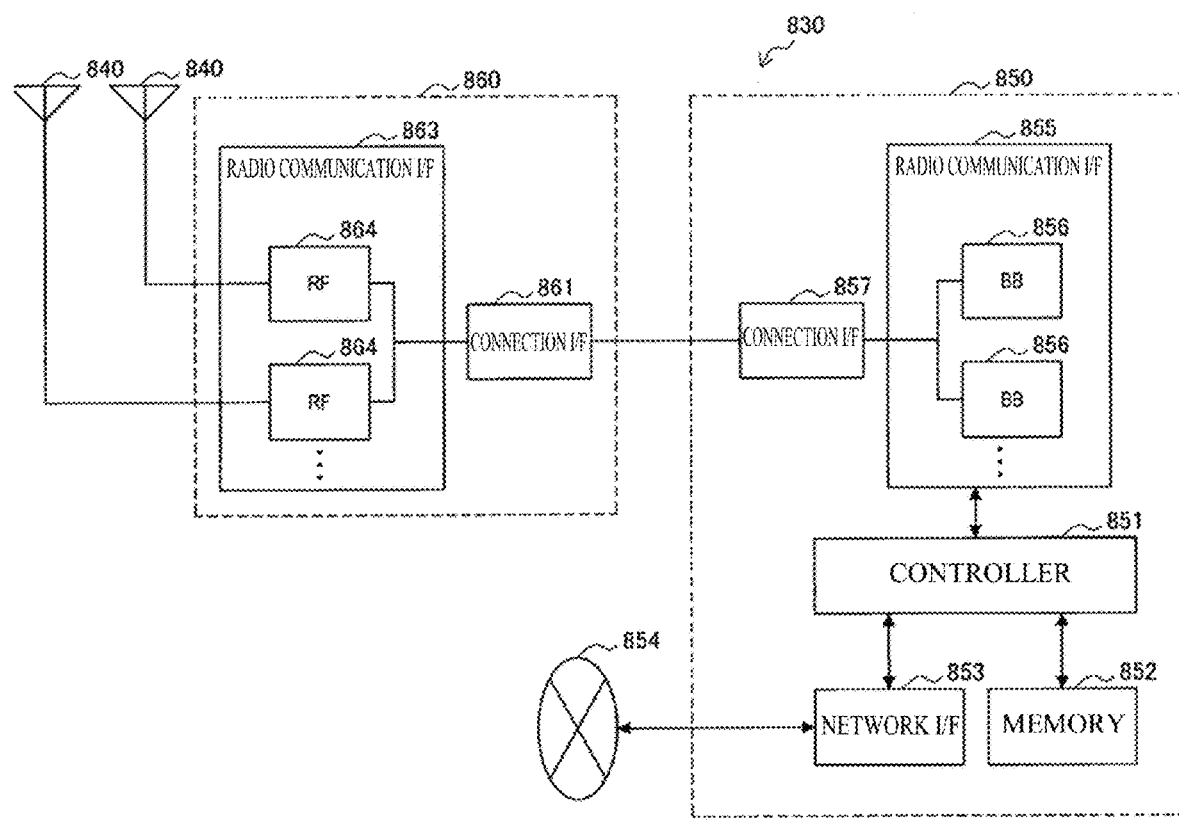
FIG. 13 is a block diagram illustrating a second example of a schematic configuration of an eNB.

FIG. 13 is a block diagram illustrating a second example of a schematic configuration of an eNB to which the technology of the present disclosure may be applied. An eNB 830 includes a plurality of antennas 840, a base station device 850 and RRH 860. The RRH 860 and each antenna 840 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna) and is used for the RRH 860 to transmit and receive wireless signals. The eNB 830 may include the multiple antennas 840, as illustrated in FIG. 13. For example, the multiple antennas 840 may be compatible with multiple frequency bands used by the eNB 830. The multiple antennas 840 are arranged as the antenna array in the above-mentioned example of the present disclosure, e.g. the columnar curved surface array antenna.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 11.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 12, except the BB processor 856 is connected to the RF circuit 864 of the RRH 860 via the connection interface 857. The wireless communication interface 855 may include the multiple BB processors 856, as illustrated in FIG. 13. For example, the multiple BB processors 856 may be compatible with multiple frequency bands used by the eNB 830. Although FIG. 13 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 13. For example, the multiple RF circuits 864 may support multiple antenna elements. Although FIG. 13 illustrates the example in which the wireless communication interface 863 includes the multiple RF circuits 864, the wireless communication interface 863 may also include a single RF circuit 864.

In the eNBs 800 and 830 shown in FIGS. 12 and 13, the processing circuitry 4112 described by using FIG. 4 may be implemented by the wireless communication interface 825 as well as the wireless communication interface 855 and/or the wireless communication interface 863. At least a part of functions may also be implemented by the controller 821 and the controller 851.

[5-2. Application Examples Regarding Terminal Devices]

First Application Example

Figure 14:
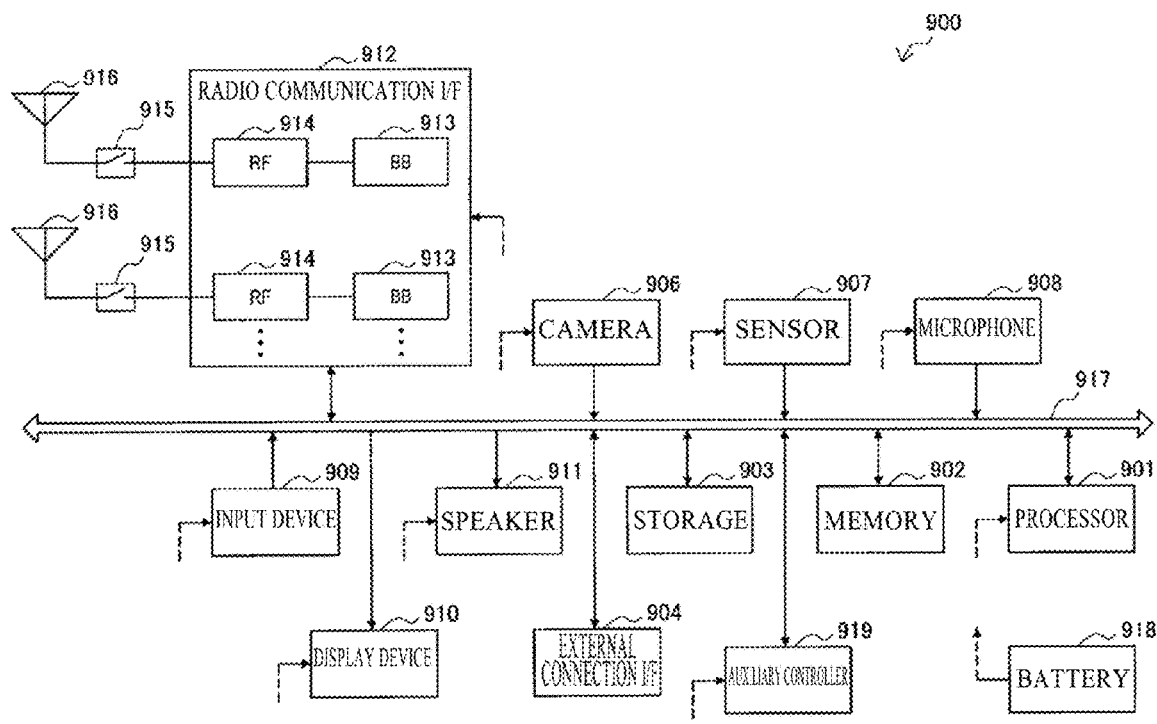
FIG. 14 is a block diagram illustrating an example of a schematic configuration of a smartphone.

FIG. 14 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may be a one chip module that has the BB processor 913 and the RF circuit 914 integrated thereon. The wireless communication interface 912 may include the multiple BB processors 913 and the multiple RF circuits 914, as illustrated in FIG. 14. Although FIG. 14 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 14. Although FIG. 14 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 14 via feeder lines, which are partially shown as dashed lines in the figure. The auxiliary controller 919 operates a minimum necessary function of the smartphone 900, for example, in a sleep mode.

In the smartphone 900 shown in FIG. 14, the processing circuitry 4212 described by using FIG. 4 may be implemented by the wireless communication interface 912. At least a part of functions may also be implemented by the processor 901 or the auxiliary controller 919.

Second Application Example

Figure 15:
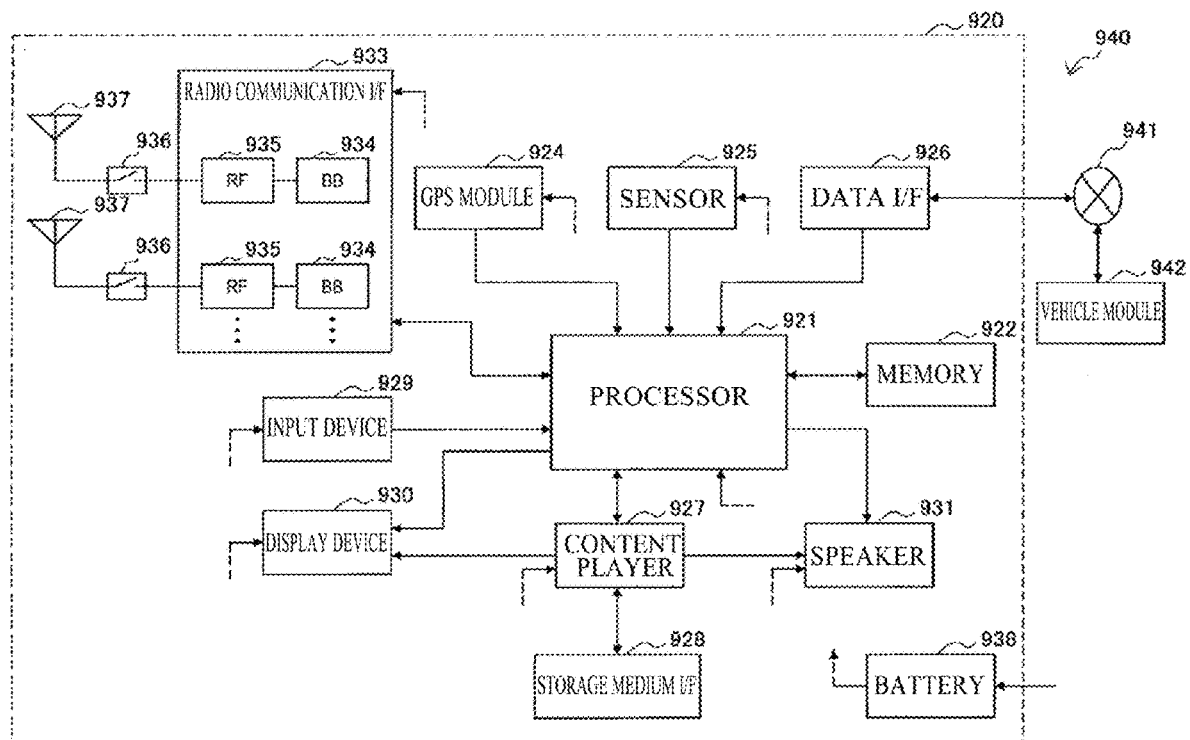
FIG. 15 is a block diagram illustrating an example of a schematic configuration of a car navigation apparatus.

FIG. 15 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may also be a one chip module having the BB processor 934 and the RF circuit 935 integrated thereon. The wireless communication interface 933 may include the multiple BB processors 934 and the multiple RF circuits 935, as illustrated in FIG. 15. Although FIG. 15 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation device 920 may include the multiple antennas 937, as illustrated in FIG. 15. Although FIG. 15 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 15 via feeder lines that are partially shown as dashed lines in the figure. The battery 938 accumulates power supplied from the vehicle.

In the car navigation device 920 shown in FIG. 15, the processing circuitry 4212 described by using FIG. 4 may be implemented by the wireless communication interface 933. At least a part of functions may also be implemented by the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

6. Conclusion

A device in a communication system and a corresponding communication processing method according to one or more embodiments of the present invention are described above.

In addition, orders of processing flows and method flows described herein are not limited to orders described in the specification and the drawings. The orders of some steps and flows may be exchanged, or they may be performed in parallel.

The detailed specification set forth above in conjunction with the drawings describes examples, and they do not represent the only possible examples, and neither represent the only examples within the scope of claims. When used in this specification, words "example" and "exemplary" mean "serving as an example, instance or illustration", do not mean "preferred" or "advantageous over other examples". The detailed specification includes specific details to provide understanding of the technology. However, these technologies may be practiced without these specific details. In some examples, well-known structures and apparatuses are shown in block diagram form, to avoid obscuring concepts of the examples.

Any one of various different sciences and technologies may be used to represent information and signals. For example, data, instructions, commands, information, signals, bits, symbols and chips which may be cited throughout the above specification may be represented by voltages, electric currents, electromagnetic waves, magnetic fields or magnetic particles, light fields or optical particles or any combination thereof.

Various schematic blocks and components described in conjunction with the present disclosure may be implemented or executed by general-purpose processors, digit signal processors (DSPs), ASICs, FPGAs or other programmable logic devices, discrete gates or transistor logics, discrete hardware components or any combination thereof, which are designed to execute functions described herein. The general-purpose processor may be a microprocessor, but instead, the processor may be any conventional processor, controller, microcontroller and/or state machine. The processor may also be implemented as a combination of computation devices, e.g. a DSP and a microprocessor, a plurality of microprocessors, one or more microprocessors in conjunction with a DSP core and/or any other combinations of such configurations.

Functions described herein may be implemented in hardware, software executed by a processor, firmware or any combination thereof. If implemented in software executed by the processor, the functions may be stored on a computer-readable medium or transmitted as one or more instructions or codes on a computer-readable medium. Other examples and implementations are within the scope and spirit of the present disclosure and the appended claims. For example, in view of the essence of software, the above described functions may be executed by using software executed by the processor, hardware, firmware, hard-wire or any combination of these. Feature to achieve the functions may also be located in various positions physically, including being distributed such that parts of the functions are implemented in different physical positions.

In addition, disclosure of a component which is contained in other components or separated from other components should be deemed to be exemplary, because potentially it is possible to implement various other architectures to achieve the same function, including incorporating all, a major part of, and/or some elements as one or more single structures or a part of a separate structure.

The computer-readable medium includes both a computer storage medium and a communication medium, the communication medium includes any medium which facilitates transmission of a computer program from one place to another place. The storage medium may be any usable medium which can be accessed by a general-purpose computer or a special-purpose computer. By way of example, and not limitation, the computer-readable media may comprise RAM, ROM, EEPROM, flash memory, CD-ROM, DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. In addition, any connection is appropriately referred to as a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. The Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above contents are also included within the scope of computer-readable media.

The foregoing description of the present disclosure is provided to enable those skilled in the art to make or use the present disclosure. Various modifications to the present disclosure are obvious to those skilled in the art, general principles defined herein may be applied to other modifications without departing from the scope the present disclosure. Therefore, the present disclosure is not limited to examples and designs described herein, but corresponds to the broadest scope consistent with the disclosed principles and new features.

What is claimed is:

1. An electronic device comprising:
    a wireless transceiver; and
    processing circuitry operatively connected to the transceiver and configured to a method, the method comprising:
        broadcasting downlink system information, the downlink system information comprising information about a number of downlink beams to be broadcast by a columnar curved surface array (CCSA) antenna, a frame structure associated with the CCSA antenna, a cell number associated with the CCSA antenna, and a beam training parameter;
        performing beam training with a remote mobile terminal based on the downlink system information, wherein the beam training comprises:
            transmitting a first reference signal beam in a first direction via a first sub array of the CCSA antenna, and a second reference signal beam in a second direction different from the first direction via a second sub array of the CCSA antenna different from the first sub array of the CCSA antenna;
            receiving, from the remote mobile terminal, first quality information corresponding to the first reference signal beam and second quality information corresponding to the second reference signal beam, the first quality information including a first Channel State Information Reference Signal (CSI-RS) resource indicator (CRI) and one of a first Received Signal Strength Indicator (RSSI) or a first Channel Quality Indicator (CQI), the second quality information including a second CRI and one of a second Received Signal Strength Indicator (RSSI) or a second Channel Quality Indicator (CQI); and
            based on the first quality information and the second quality information, determining a sub array of the CCSA antenna to serve the remote mobile terminal; and
        upon completion of the beam training, the method further comprises:
            transmitting a reference signal to the remote mobile terminal via the determined sub array;
            receiving, from the remote terminal channel in response to the reference signal, channel state information including a rank indicator (RI), a channel quality indicator (CQI) and a pre-coding matrix indicator (PMI);
            based on the received channel state information, determining a scheduling scheme for the remote mobile terminal, the scheduling scheme comprising data precoding information, modulation and coding information and transmission resource information to be used for communicating with the remote mobile terminal via the determined sub array; and
            transceiving data with the remote mobile terminal via the determined sub array in accordance with the scheduling scheme.

2. The electronic device of claim 1, wherein a size of the determined sub array is based on a predetermined strategy for optimizing sub array assignments against communication requirements of multiple remote mobile terminals, the multiple remote mobile terminals including the remote mobile terminal.

3. The electronic device of claim 2, wherein the remote mobile terminal is assigned to one of plural mobile terminal channel quality groups based upon a predetermined grouping scheme related to the predetermined strategy for optimizing sub array assignments, wherein each group of the plural mobile terminal channel quality groups is served by a different sub array of the CCSA antenna.

4. The electronic device of claim 1, wherein the determined sub array has a same number of antenna elements in a vertical direction as the CCSA antenna, and antenna elements of the determined sub array in a horizontal direction are composed of a plurality of adjacent antenna elements of the CCSA antenna in the horizontal direction.

5. The electronic device of claim 1, wherein the first quality information further includes a first Precoding Matrix Indicator (PMI) or a first Rank Indicator (RI), and the second quality information further includes a second PMI or a second RI.

6. The electronic device of claim 1, wherein a size of the determined sub array is based on a business category associated with the remote mobile terminal, the business category comprising a high data volume business category or a low data volume business category.

7. The electronic device of claim 1, wherein the determined sub array comprises a sub array that provides a highest possible communication quality to the remote mobile terminal.

8. The electronic device of claim 1, wherein the beam training comprises fine beam training or rough beam training, the fine beam training including determining the sub array from all possible sub arrays of the CCSA antenna, and the rough beam training including determining the sub array from a subset of all possible sub arrays of the CCSA antenna.

9. The electronic device of claim 1, wherein the processing circuitry is further configured to:
after transceiving the data with the remote mobile terminal, receive updated quality information from the remote mobile terminal;
modify one of the sub array or the scheduling scheme based on the updated quality information; and
transceive second data with the remote mobile terminal based on the modified sub array or the modified scheduling scheme.

10. The electronic device of claim 1, wherein the beam training comprises transmitting a common beam-forming parameter via the first and the second sub arrays of the CCSA antenna.

11. A method for determining a sub array of a columnar curved surface array (CCSA) antenna by an electronic device that includes a processor and a transceiver, the method comprising:
broadcasting downlink system information, the downlink system information comprising information about a number of downlink beams to be broadcast by the CCSA antenna, a frame structure associated with the CCSA antenna, a cell number associated with the CCSA antenna, and a beam training parameter;
performing beam training with a remote mobile terminal based on the downlink system information, wherein the beam training comprises:
transmitting a first reference signal beam in a first direction via a first sub array of the CCSA antenna, and a second reference signal beam in a second direction different from the first direction via a second sub array of the CCSA antenna different from the first sub array of the CCSA antenna;
receiving, from the remote mobile terminal, first quality information corresponding to the first reference signal beam and second quality information corresponding to the second reference signal beam, the first quality information including a first Channel State Information Reference Signal (CSI-RS) resource indicator (CRI) and one of a first Received Signal Strength Indicator (RSSI) or a first Channel Quality Indicator (CQI), the second quality information including a second CRI and one of a second Received Signal Strength Indicator (RSSI) or a second Channel Quality Indicator (CQI); and
determining a sub array of the CCSA antenna to serve the remote mobile terminal based on the first quality information and the second quality information; and
upon completion of the beam training:
transmitting a reference signal to the remote mobile terminal via the determined sub array;
receiving, from the remote terminal channel in response to the reference signal, channel state information including a rank indicator (RI), a channel quality indicator (CQI) and a pre-coding matrix indicator (PMI);
based on the received channel state information, determining a scheduling scheme for the remote mobile terminal, the scheduling scheme comprising data precoding information, modulation and coding information and transmission resource information to be used for communicating with the remote mobile terminal via the determined sub array; and
transceiving data with the remote mobile terminal via the determined sub array in accordance with the scheduling scheme.

12. The method of claim 11, wherein the determining the sub array comprises determining a size of the sub array based on a predetermined strategy for optimizing sub array assignments against communication requirements of multiple remote mobile terminals, the multiple remote mobile terminals including the remote mobile terminal.

13. The method of claim 12, wherein the determining a size of the sub array based on a predetermined strategy for optimizing sub array assignments comprises assigning the remote mobile terminal to one of plural mobile terminal channel quality groups based upon a predetermined grouping scheme related to the predetermined strategy for optimizing sub array assignments, wherein each group of the plural mobile terminal channel quality groups is served by a different sub array of the CCSA antenna.

14. The method of claim 11, wherein the first quality information further includes a first Precoding Matrix Indicator (PMI) or a first Rank Indicator (RI), and the second quality information further includes a second PMI or a second RI.

15. The method of claim 11, wherein the determining the sub array comprises determining a size of the sub array based on a business category associated with the remote mobile terminal, the business category comprising a high data volume business category or a low data volume business category.

16. The method of claim 11, wherein the determining the sub array comprises assigning a sub array that provides a highest possible communication quality to the remote mobile terminal.

17. The method of claim 11, wherein the beam training comprises fine beam training or rough beam training, the fine beam training including determining the sub array from all possible sub arrays of the CCSA antenna, and the rough beam training including determining the sub array from a subset of all possible sub arrays of the CCSA antenna.

18. The method of claim 11, further comprising:
after transceiving the data with the remote mobile terminal, receiving updated quality information from the remote mobile terminal;
modifying one of the sub array or the scheduling scheme based on the updated quality information; and
transceiving second data with the remote mobile terminal based on the modified sub array or the modified scheduling scheme.

19. The method of claim 11, wherein the beam training comprises transmitting a common beam-forming parameter via the first and the second sub arrays of the CCSA antenna.

20. A non-transitory computer-readable program product comprising instructions for causing an electronic device to perform a method for determining a sub array of a columnar curved surface array (CCSA) antenna, the electronic device including a processor and a transceiver, the method comprising:
- broadcasting downlink system information, the downlink system information comprising information about a number of downlink beams to be broadcast by the CCSA antenna, a frame structure associated with the CCSA antenna, a cell number associated with the CCSA antenna, and a beam training parameter;
- performing beam training with a remote mobile terminal based on the downlink system information, wherein the beam training comprises:
  - transmitting a first reference signal beam in a first direction via a first sub array of the CCSA antenna, and a second reference signal beam in a second direction different from the first direction via a second sub array of the CCSA antenna different from the first sub array of the CCSA antenna; and
  - receiving, from the remote mobile terminal, first quality information corresponding to the first reference signal beam and second quality information corresponding to the second reference signal beam, the first quality information including a first Channel State Information Reference Signal (CSI-RS) resource indicator (CRI) and one of a first Received Signal Strength Indicator (RSSI) or a first Channel Quality Indicator (CQI), the second quality information including a second CRI and one of a second Received Signal Strength Indicator (RSSI) or a second Channel Quality Indicator (CQI); and
  - determining a sub array of the CCSA antenna to serve the remote mobile terminal based on the first quality information and the second quality information; and
- upon completion of the beam training, the method further comprises:
  - transmitting a reference signal to the remote mobile terminal via the determined sub array;
  - receiving, from the remote terminal channel in response to the reference signal, channel state information including a rank indicator (RI), a channel quality indicator (CQI) and a pre-coding matrix indicator (PMI),
  - based on the received channel state information, determining a scheduling scheme for the remote mobile terminal, the scheduling scheme comprising data precoding information, modulation and coding information and transmission resource information to be used for communicating with the remote mobile terminal via the determined sub array; and
  - transceiving data with the remote mobile terminal via the determined sub array in accordance with the scheduling scheme.

* * * * *